(12) United States Patent
Vogel

(10) Patent No.: US 7,946,952 B2
(45) Date of Patent: May 24, 2011

(54) FORWARD CLUTCH HIGH PRESSURE HOLDING VALVE FOR HYBRID VEHICLES TO ENABLE ENGINE START-STOP-DRIVE FUNCTIONS

(75) Inventor: Wayne B. Vogel, Canton, MI (US)

(73) Assignee: GM Global Technology Operations LLC

( * ) Notice: Subject to any disclaimer, the term of this patent is extended or adjusted under 35 U.S.C. 154(b) by 557 days.

(21) Appl. No.: 11/673,810

(22) Filed: Feb. 12, 2007

(65) Prior Publication Data
US 2008/0190724 A1    Aug. 14, 2008

(51) Int. Cl.
- *H02P 15/00* (2006.01)
- *B60W 10/02* (2006.01)
- *B60W 10/04* (2006.01)
- *F16D 25/00* (2006.01)
- *F16D 43/28* (2006.01)

(52) U.S. Cl. ............ 477/7; 477/6; 477/8; 477/180; 477/174; 192/85.01

(58) Field of Classification Search ........... 477/6, 7, 477/11, 174, 181, 8, 180; 192/85 R, 85.01
See application file for complete search history.

(56) References Cited

U.S. PATENT DOCUMENTS

| | | | | |
|---|---|---|---|---|
| 5,511,644 A * | 4/1996 | Murata | ............ | 192/85 AA |
| 5,611,407 A * | 3/1997 | Maehara et al. | ............ | 180/249 |
| 6,729,988 B2 * | 5/2004 | Katou et al. | ............ | 475/128 |
| 6,779,644 B2 * | 8/2004 | Ackermann | ............ | 192/109 F |
| 6,805,647 B2 * | 10/2004 | Silveri et al. | ............ | 475/4 |
| 7,163,481 B2 * | 1/2007 | Takagi et al. | ............ | 475/101 |
| 7,314,128 B2 * | 1/2008 | Gunderson et al. | ............ | 192/85 AA |
| 2003/0042098 A1 * | 3/2003 | Takeuchi et al. | ............ | 192/3.29 |

FOREIGN PATENT DOCUMENTS

JP         04083924 A   *   3/1992

* cited by examiner

*Primary Examiner* — Tisha D Lewis

(57) ABSTRACT

A transmission for a hybrid vehicle including a combustion engine and an electric propulsion system may include a forward clutch assembly, a fluid chamber, a fluid supply, and a forward clutch holding valve. The forward clutch assembly may include a hydraulically actuated clutch member in communication with the fluid chamber. The forward clutch holding valve may be in communication with the fluid chamber and the fluid supply. The valve may provide communication between the fluid supply and the fluid chamber when in a first position and may seal the fluid chamber when in a second position, thereby maintaining a fixed quantity of fluid within the fluid chamber.

17 Claims, 5 Drawing Sheets

FORWARD CLUTCH HIGH PRESSURE HOLDING VALVE FOR HYBRID VEHICLES TO ENABLE ENGINE START-STOP-DRIVE FUNCTIONS

FIELD

The present disclosure relates to hybrid vehicles, and more specifically to transmissions for hybrid vehicles.

BACKGROUND

The statements in this section merely provide background information related to the present disclosure and may not constitute prior art.

Internal combustion engines produce drive torque that is transferred to a drivetrain. The drive torque is transferred through a transmission that multiplies the drive torque by a gear ratio. Transmissions generally include multiple gear ratios through which the drive torque is transferred. Automatic transmissions automatically shift between gear ratios based on driver input and vehicle operating conditions. Traditionally, automatic transmissions include a forward clutch and a reverse clutch for actuation between forward and reverse driving conditions through the use of a pressurized hydraulic fluid. The hydraulic fluid is typically pressurized during operation of the engine.

Hybrid powertrains typically include an electric machine and an energy storage device (ESD) such as battery or super capacitor. In one mode, the electric machine drives the transmission using energy stored in the ESD. In another mode, the electric machine is driven by the engine to charge the ESD. When operated in the first mode, the hybrid vehicle may be operated without the use of the engine. When operated without the use of the engine, an auxiliary pressurizing mechanism, such as an electric pump, is typically used to pressurize the hydraulic transmission fluid to provide for engagement of the forward clutch.

SUMMARY

Accordingly, a transmission for a hybrid vehicle including a combustion engine and an electric propulsion system may include a forward clutch assembly, a fluid chamber, a fluid supply, and a forward clutch holding valve. The forward clutch assembly may include a hydraulically actuated clutch member in communication with the fluid chamber. The forward clutch holding valve may be in communication with the fluid chamber and the fluid supply. The valve may provide communication between the fluid supply and the fluid chamber when in a first position and may seal the fluid chamber when in a second position, thereby maintaining a fixed quantity of fluid within the fluid chamber.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
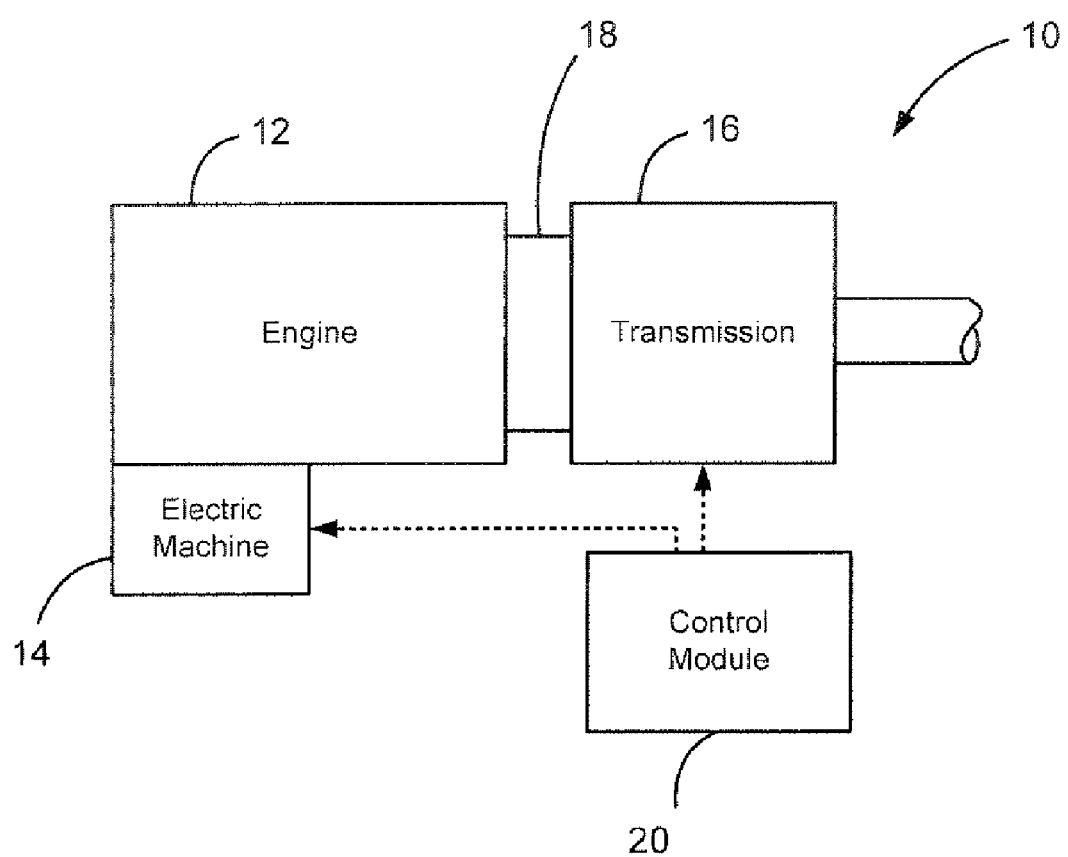
FIG. 1 is a schematic illustration of a hybrid vehicle according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary hybrid vehicle 10 is schematically illustrated. The hybrid vehicle 10 includes a combustion engine 12 and an electric machine 14, which selectively drive a transmission 16. Drive torque may be transmitted from engine 12 and/or electric machine 14 to transmission 16 through a coupling device 18. Transmission 16 may be an automatic transmission and coupling device 18 may include a torque converter.

Hybrid vehicle 10 may be operable in first and second modes. Control module 20 may be in communication with and may receive and send control signals to engine 12 and transmission 16 to control operation thereof in the first and second modes. In a first mode of operation, engine 12 may be operated, providing drive toque for hybrid vehicle 10 and/or charging of electric machine 14. In the second mode, engine 12 may be powered off. In the second mode, drive torque for hybrid vehicle 10 may be provided solely by electric machine 14. Whether operating in the first or second modes, drive torque is transmitted to transmission 16 in order to drive hybrid vehicle 10.

Figure 2:
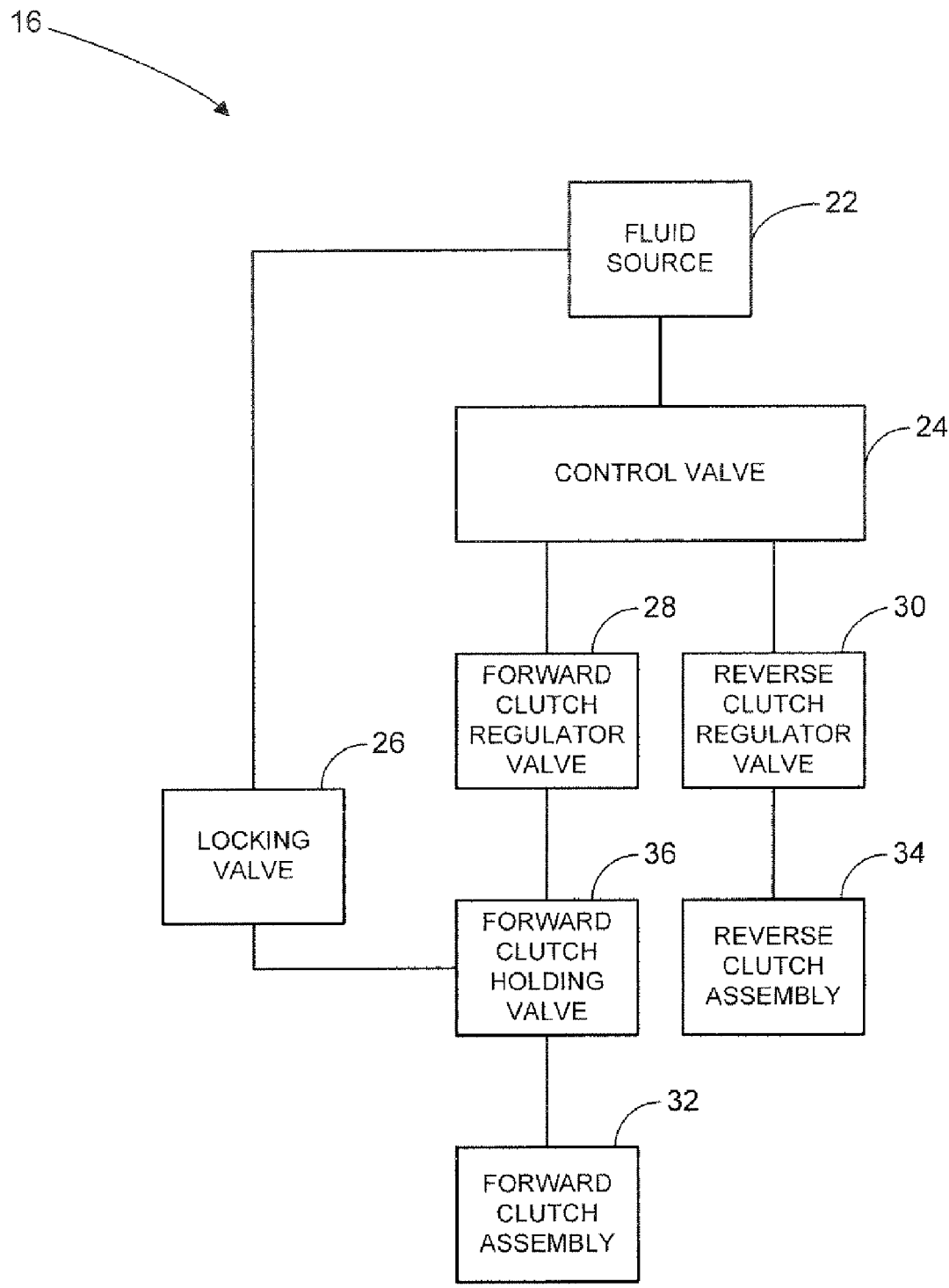
FIG. 2 is a functional block diagram illustration of a transmission of the hybrid vehicle of FIG. 1.

With additional reference to FIG. 2, a functional block diagram of transmission 16 is illustrated. Transmission 16 may include a fluid source 22 providing hydraulic fluid for transmission 16. Fluid source 22 may include a pumping mechanism powered by engine 12 for pressurizing the hydraulic transmission fluid for actuation of transmission 16, as discussed below. Fluid source 22 may be in communication with a control valve 24 and a locking valve 26. Control valve 24 may be in fluid communication with a forward clutch regulator valve 28 and a reverse clutch regulator valve 30. Control valve 24 may provide selective communication between fluid source 22 and the forward and reverse clutch regulator valves 28, 30. Transmission 16 may be actuated between forward, reverse, and neutral conditions by the pressurized hydraulic fluid provided by fluid source 22 during operation of engine 12. More specifically, forward and reverse clutch regulator valves 28, 30 may be in fluid communication with forward and reverse clutch assemblies 32, 34. Selectively providing the pressurized hydraulic fluid to forward and reverse clutch assemblies 32, 34 allows actuation between the forward, reverse, and neutral conditions.

A forward clutch holding valve 36 may be disposed between and in fluid communication with forward clutch regulator valve 28 and forward clutch assembly 32. Locking valve 26 may also be in fluid communication with forward clutch holding valve 36, as discussed below. With additional reference to FIGS. 3 and 4, forward clutch holding valve 36 may include a valve housing 38 containing a valve 40 therein. Valve housing 38 may include an inlet port 42, an outlet port 44, and first and second valve actuation ports 46, 48. An inner bore 50 may include first and second portions 52, 54 housing valve 40 therein.

Valve 40 may include a central portion 56 having first and second portions 58, 60 extending therefrom. Central portion 56 may be disposed in bore second portion 54 and may have an outer diameter generally corresponding to the inner diameter of bore second portion 54. Valve first portion 58 may be disposed in bore first portion 52 and may have an outer diameter generally corresponding to the inner diameter of bore first portion 52. The outer diameter of valve first portion 58 may be less than the outer diameter of valve central portion 56 creating an annular surface 62 on a first side of central portion 56. Valve second portion 60 may have an outer diameter that is less than the outer diameter of valve central portion 56 creating an annular surface 64 on a second side of central portion 56. A biasing member 66, such as a spring, may extend between a first end 68 of bore second portion 54 and valve annular surface 64. The outer diameter of valve second portion 60 may be less than the outer diameter of valve first portion 58. As such, annular surface 64 on the second side of central portion 56 may have a greater surface area than annular surface 62. First end 68 of bore second portion 54 may act as a first stop for valve 40, as discussed below.

Valve housing inlet port 42 may extend into bore first portion 52. A flow path 70 may extend from an end 72 of bore first portion 52 to outlet port 44. End 72 may act as a second stop for valve 40, as discussed below. First and second valve actuation ports 46, 48 may extend into bore second portion 54.

Forward clutch assembly 32 may include a hydraulic chamber 74, a clutch piston 76, and a series of clutch plates 78. Hydraulic chamber 74 may be in communication with clutch piston 76. Clutch piston 76 may be operably coupled to clutch plates 78 for selective engagement thereof, as discussed below. A first fluid path 80 extends between hydraulic chamber 74 and valve housing outlet port 44. A second fluid flow path 82 extends between inlet port 42 and forward clutch regulator valve 28 and a third fluid flow path 84 extends between first valve actuation port 46 and forward clutch regulator valve 28. A fourth fluid flow path 86 extends between second valve actuation port 48 and locking valve 26.

Figure 5:
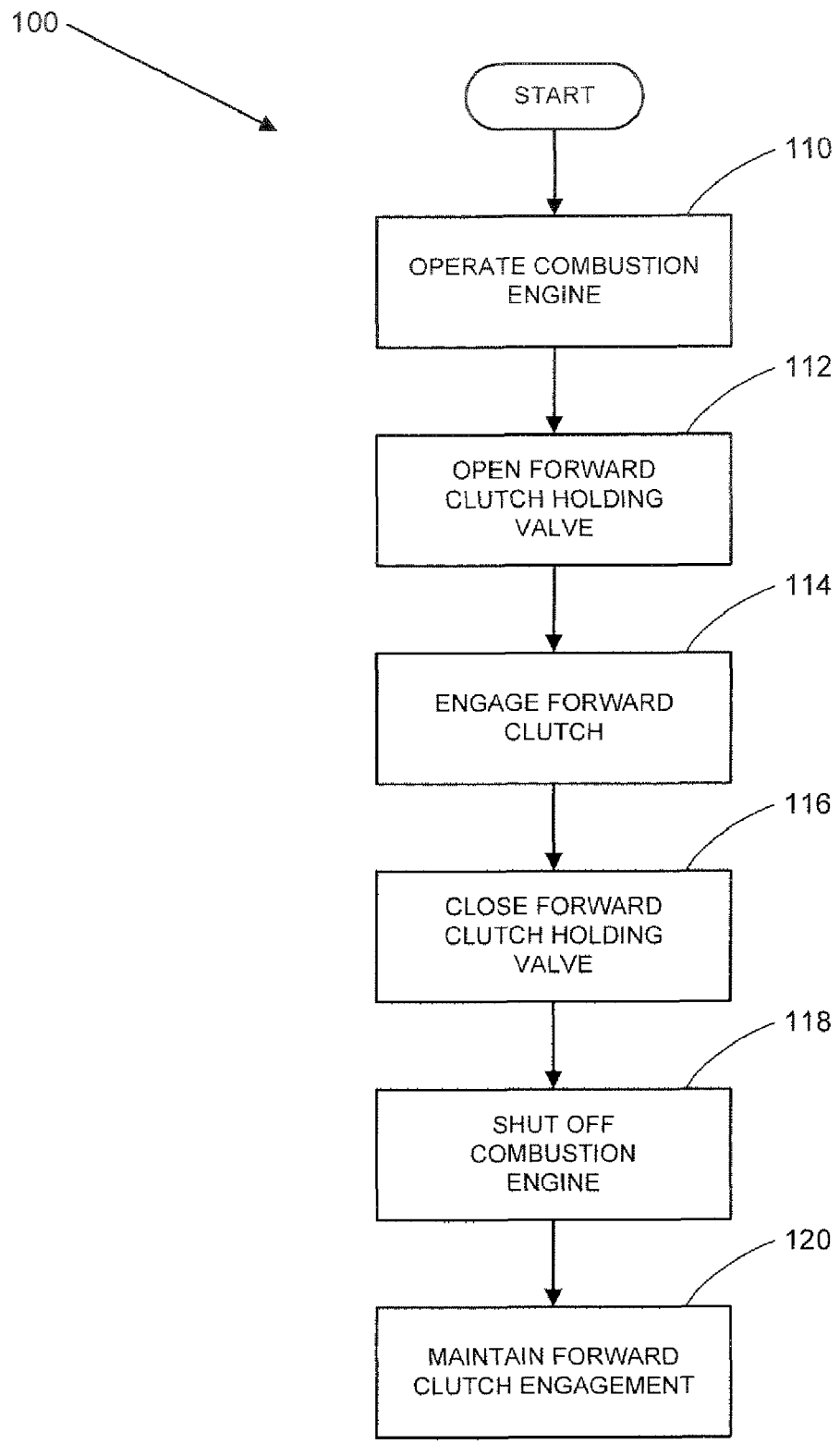
FIG. 5 is a flow chart illustrating operation of the transmission of FIG. 2.

With additional reference to FIG. 5, flow chart 100 generally shows the operation of transmission 16. As indicated in step 110, engine 12 is initially operated to allow for pressurization of fluid source 22, as discussed above. Transmission 16 may then provide for a forward drive condition by providing pressurized fluid from forward clutch holding valve 36. As indicated at step 112, forward clutch holding valve 36 may be opened to provide for engagement of forward clutch assembly 32, as indicated at step 114.

Figure 3:
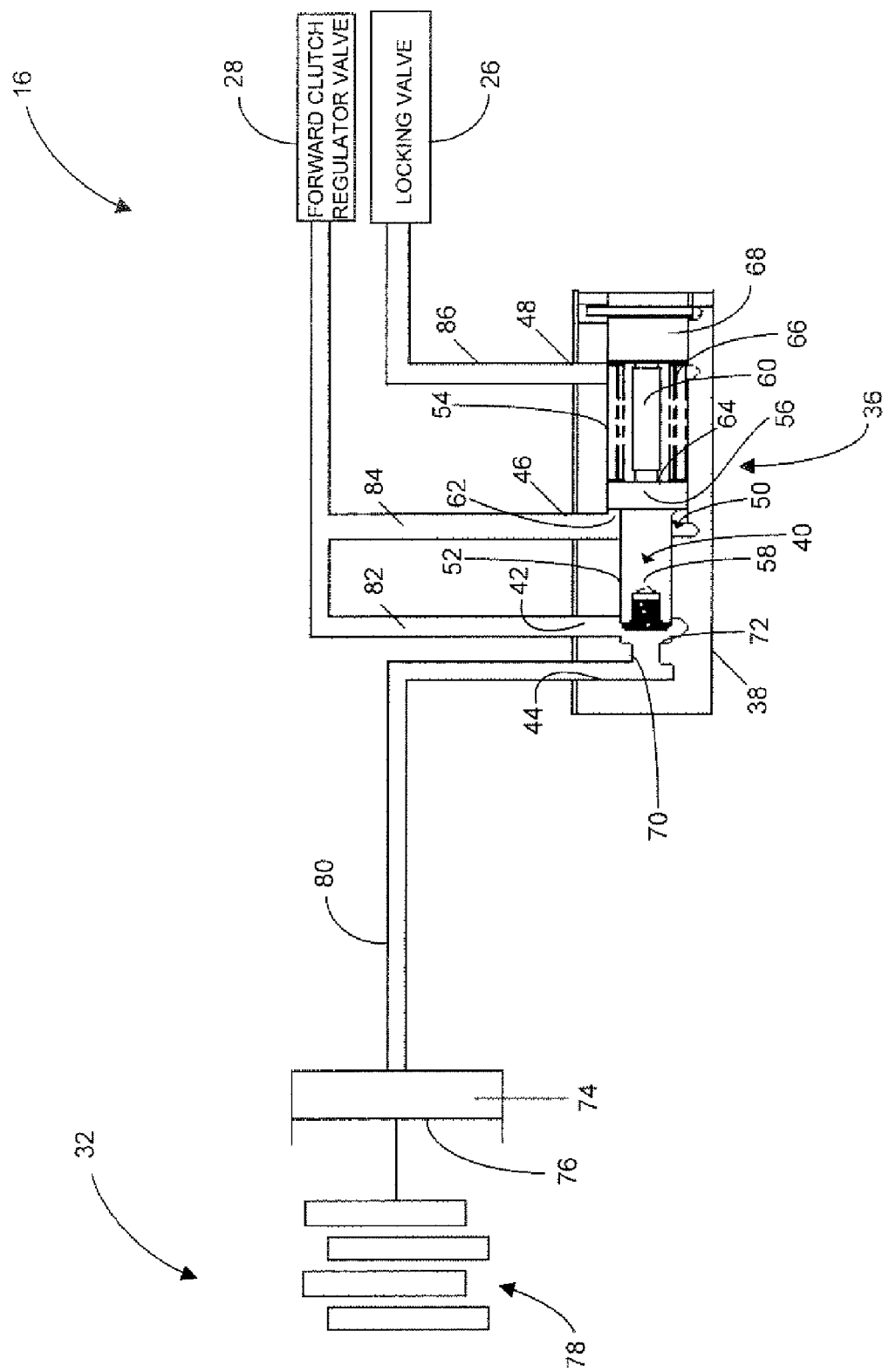
FIG. 3 is a schematic illustration of a forward clutch portion of the transmission of FIG. 2.

More specifically, as seen in FIG. 3, valve 40 may be displaced to an open position, allowing fluid communication between inlet port 42 and outlet port 44. Valve 40 may be displaced to the open position by pressurized fluid provided by forward clutch regulator valve 28 entering valve housing 38 at first valve control port 46 and acting upon annular surface 62 of valve 40. The force created by the pressurized fluid may be greater than that applied by biasing member 66, resulting in the opening of forward clutch holding valve 36. Pressurized fluid may therefore travel through first fluid path 80 and into hydraulic chamber 74, where it acts upon clutch piston 76, urging clutch plates 78 into engagement.

Figure 4:
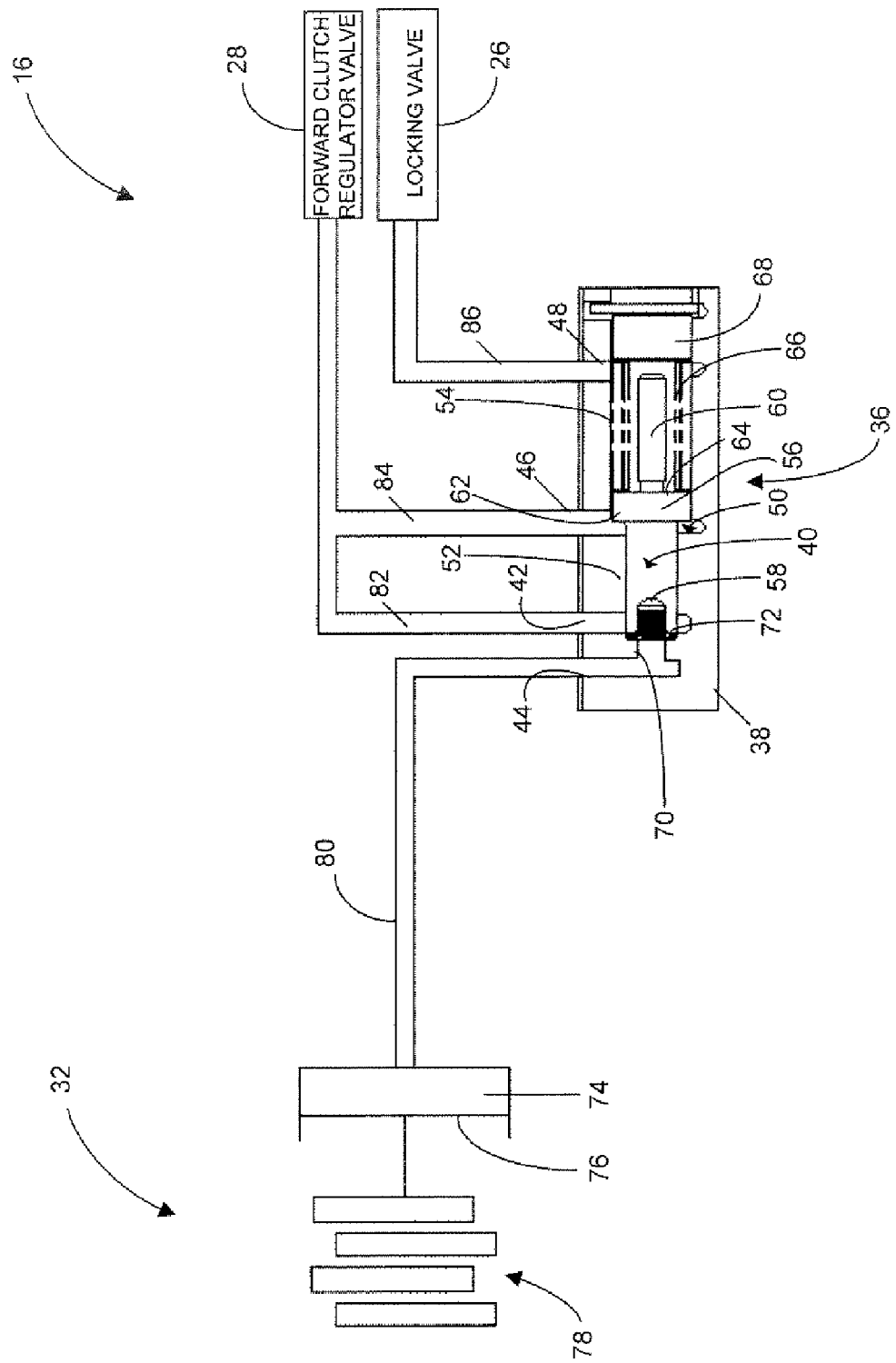
FIG. 4 is an additional schematic illustration of the forward clutch portion of the transmission of FIG. 2.

As indicated at step 116, and seen in FIG. 4, forward clutch holding valve 36 may be closed. Operation of hybrid vehicle 10 may then be operated in an engine-off condition while maintaining engagement of the forward clutch assembly without the use of an auxiliary fluid pump or fluid source. Forward clutch holding valve 36 may be closed before the engine-off condition to maintain fluid pressure in hydraulic chamber 74. More specifically, locking valve 26 may provide pressurized fluid to bore second portion 54, resulting in a force being applied on annular surface 64 of valve central portion 56. The combination of the force applied by the pressurized fluid on annular surface 64 and the force applied by biasing member 66 may be greater than the force applied by the pressurized fluid acting upon annular surface 62, resulting in displacement of valve 40 to the closed position.

When in the closed position (seen in FIG. 4), valve first portion 58 abuts bore end 72, sealing outlet port 44 from inlet port 42. As such, hydraulic chamber 74 is in a sealed condition, where fluid neither exits nor enters, resulting in a generally constant pressure being applied to clutch piston 76. The pressure in hydraulic chamber 74 is sufficient for engagement of clutch plates 78 by clutch piston 76 when hydraulic chamber 74 is sealed. Therefore, clutch plates 78 remain in an engaged condition when hydraulic chamber 74 is sealed.

As indicated at step 118, engine 12 may then be powered off resulting in the pressure provided by locking valve 26 and forward clutch regulator valve 28 being greatly reduced. When in the engine-off condition, valve 40 may be held in the closed position through the force applied by biasing member 66 maintaining engagement of the forward clutch assembly 32, as indicated at step 120. As such, forward clutch engagement may be maintained in hybrid vehicle 10 without the use of an auxiliary source of pressurized fluid.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A transmission for a hybrid vehicle including a combustion engine and an electric propulsion system, said transmission comprising:
    a forward clutch assembly including a hydraulically actuated clutch member;
    a fluid chamber in communication with said hydraulically actuated clutch member;
    a fluid supply; and
    a forward clutch holding valve in communication with said fluid chamber and said fluid supply, said valve providing communication between said fluid supply and said fluid chamber when in a first position and sealing said fluid chamber when in a second position, thereby maintaining a fixed quantity of fluid within said fluid chamber, said valve including a spring applying a first biasing force urging said valve into said second position.

2. The transmission of claim 1, wherein said fluid supply provides a quantity of fluid to said fluid chamber creating a force on said clutch member resulting in an engaged condition of said forward clutch assembly when said valve is in said first position.

3. The transmission of claim 2, wherein said engaged condition is maintained by displacing said valve to said second position, said fluid chamber containing a volume of fluid sufficient to maintain said force created by said fluid on said clutch member when sealed by said valve.

4. The transmission of claim 3, wherein said valve is in said second position during non-operation of the combustion engine.

5. The transmission of claim 1, wherein said fluid supply applies a second biasing force generally opposite said first biasing force, said second biasing force being greater than said first biasing force and urging said valve into said first position.

6. The transmission of claim 5, further comprising a second fluid supply, said second fluid supply selectively supplying a pressurized fluid to said valve, said pressurized fluid applying a third biasing force generally opposite said second biasing force, the combination of said first and third biasing forces being greater than said second biasing force.

7. The transmission of claim 5, wherein said first biasing force is greater than said second biasing force during non-operation of the engine, biasing said valve to said second position.

8. The transmission of claim 1, wherein said forward clutch assembly is maintained in an engaged condition when said forward clutch holding valve is in said second position without communication between said fluid chamber and a source of pressurized fluid.

9. The transmission of claim 8, wherein said forward clutch holding valve is in said second position during non-operation of the combustion engine.

10. A method of engaging a hydraulically actuated forward clutch assembly of a transmission for a hybrid vehicle including a combustion engine and an electric propulsion system, said method comprising:
  providing a fluid to a fluid chamber of the hydraulically actuated forward clutch assembly;
  engaging a clutch member of the forward clutch due to a force applied by the fluid contained in the fluid chamber; and
  sealing the fluid chamber to maintain said engagement of the clutch member, said sealing maintained during non-operation of the combustion engine by a spring applying a first biasing force to a forward clutch holding valve and urging the valve to a position sealing the fluid chamber.

11. The method of claim 10, wherein said providing includes selectively providing a pressurized fluid from a fluid supply source during operation of the combustion engine.

12. The method of claim 11, wherein said sealing includes isolating the fluid chamber from the fluid supply source after said providing.

13. The method of claim 12, wherein said sealing includes maintaining the fluid within the fluid chamber at a predetermined pressure.

14. The method of claim 13, wherein said sealing includes preventing the fluid within the fluid chamber from escaping the fluid chamber.

15. A method of engaging a hydraulically actuated forward clutch of a transmission for a hybrid vehicle including a combustion engine and an electric propulsion system during non-operation of the combustion engine, said method comprising:
  providing a hydraulically actuated clutch including a fluid chamber for engagement of a clutch member, the fluid chamber containing a fluid at a predetermined pressure corresponding to an engaged condition of the clutch member;
  engaging the forward clutch based on said providing;
  sealing the fluid chamber, thereby maintaining the predetermined pressure within the fluid chamber; and
  powering off the combustion engine, the fluid chamber remaining sealed after said powering off of the combustion engine by a spring applying a first biasing force to a forward clutch holding valve and urging the valve to a position sealing the fluid chamber.

16. The method of claim 15, wherein said engaging continues after said powering off of the combustion engine.

17. The method of claim 15, wherein said engaging is maintained after said powering off of the combustion engine solely by said sealing.

\* \* \* \* \*